United States Patent [19]

Takeuchi

[11] Patent Number: 5,344,299
[45] Date of Patent: Sep. 6, 1994

[54] RESIN MATERIAL SUPPLY APPARATUS FOR RESIN PRESS MOLDING MACHINE

[75] Inventor: Naoki Takeuchi, Kobe, Japan

[73] Assignee: Kabushiki Kaisha Kobe Seiko Sho, Kobe, Japan

[21] Appl. No.: 863,733

[22] Filed: Apr. 6, 1992

[51] Int. Cl.$^5$ .................. B29C 43/34; B29C 47/00
[52] U.S. Cl. .................. 425/142; 264/40.1; 264/142; 264/148; 425/146; 425/164; 425/166; 425/296; 425/310
[58] Field of Search .................. 83/62; 425/142, 145, 425/146, 164, 172, 166, 148, 167, 256, 310, 311, 292, 376.1, 377, 296, 297, 67, 382.3, 382.4, 287, 288; 264/167, 142, 148, 40.1, 40.3

[56] References Cited

U.S. PATENT DOCUMENTS

| | | | |
|---|---|---|---|
| 1,528,263 | 3/1925 | Peelle | 264/150 |
| 1,829,120 | 10/1931 | Toews | 425/287 |
| 2,608,940 | 9/1952 | Nagel et al. | 425/288 |
| 3,074,107 | 1/1963 | Mase et al. | 264/167 |
| 3,557,403 | 1/1971 | Lemelson | 425/142 |
| 3,587,281 | 6/1971 | Lemelson | 264/167 |
| 3,732,049 | 5/1973 | Studli | 425/311 |
| 4,565,512 | 1/1986 | Wills et al. | 425/376.1 |
| 4,710,113 | 12/1987 | Voigt | 425/67 |
| 4,867,665 | 9/1989 | Wada | 425/146 |
| 5,030,080 | 7/1991 | Fukuda et al. | 425/148 |
| 5,165,941 | 11/1992 | Hawley | 425/148 |

FOREIGN PATENT DOCUMENTS

| | | | |
|---|---|---|---|
| 5589333 | 5/1987 | France | 425/311 |
| 48-4178 | 2/1973 | Japan | 425/310 |

*Primary Examiner*—Jay H. Woo
*Assistant Examiner*—Duane S. Smith
*Attorney, Agent, or Firm*—Oblon, Spivak, McClelland, Maier & Neustadt

[57] ABSTRACT

The present invention has a purpose to prevent leakage of resin material and disorder of cutting operation without increasing plate thickness of the cutter, thereby providing a resin material supply apparatus capable of suiting increase of resin material sheet size or higher back pressure.

To this end, according to the present invention, there is provided a resin material supply apparatus and method for a resin press molding machine in which: resin material is extruded in a supply cylinder toward a die by a piston, and the molded resin material is cut by a cutter which slides along a front end surface of the die. Then, the cut resin material is supplied onto a metal mold, and new resin material is charged into the supply cylinder by pressing the cutter toward the die at a position that the cutter closes an opening of the die.

9 Claims, 6 Drawing Sheets

F I G. 5
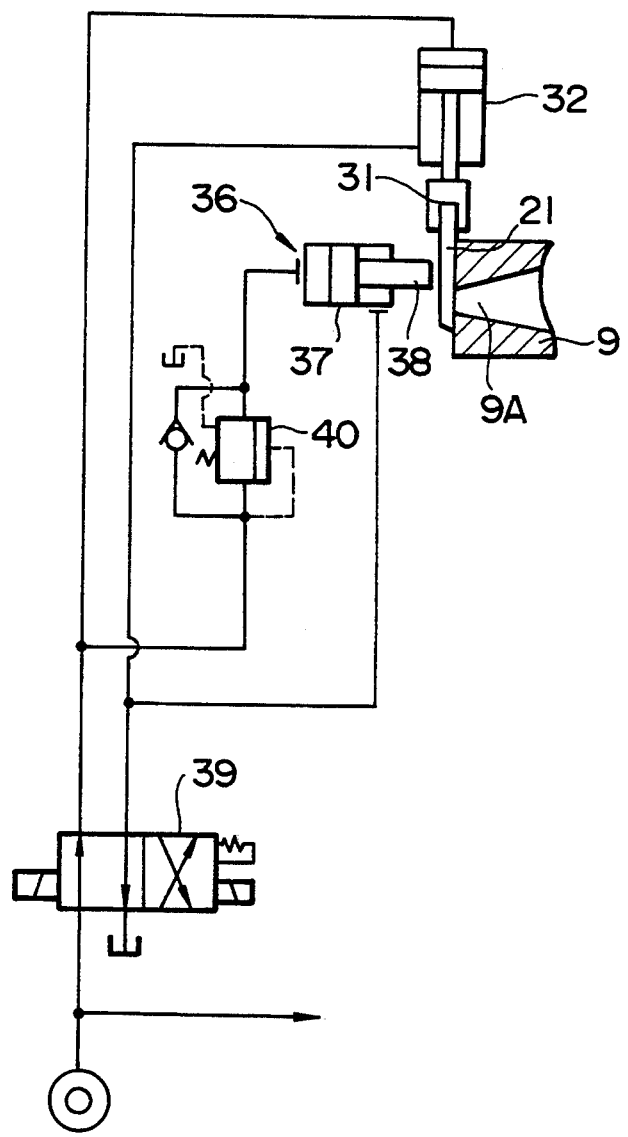

RESIN MATERIAL SUPPLY APPARATUS FOR RESIN PRESS MOLDING MACHINE

BACKGROUND OF THE INVENTION

1. Field of the Invention:

The present invention relates to a resin material supply apparatus and method for resin press molding machines.

2. Description of the Prior Art:

Conventionally, as shown in FIG. 7, there has been known a resin material supply apparatus which supplies resin material on a metal mold of the resin press molding machine such as a SMC molding press and so on.

Namely, in FIG. 7, a reference numeral 1 denotes a resin press molding machine, which includes a fixed lower metal mold 2 and an upper metal mold 3 provided movable in an up-and-down direction. A reference numeral 4 denotes a resin material. A reference numeral 5 denotes a resin material supply apparatus, which comprises a shiftable table 6, a supply cylinder 7 provided horizontally on the shiftable table 6, a piston 8 extruding the resin material 4 in the supply cylinder 7, a die 9 having an opening 9A for forming the resin material extruded from the supply cylinder by the piston 8 in a predetermined configuration, and a charge device 11 charging the resin material 4 in the cartridge 10 into the supply cylinder 7.

The piston 8 is connected through a piston rod 12 to an extrusion cylinder 13, and is slidable in the supply cylinder 7 by expansion and contraction of this extrusion cylinder 13. The die 9 is connected through a cylindrical body 14 to the front end of the supply cylinder 7, and a shutter device 16 is provided between the cylindrical body 14 and the die 9 so as to open or close a resin passage formed therein. The shutter device 16 comprises, as shown in FIG. 8, a shutter plate 19 having a hole 18, and a shutter cylinder 20 actuating this shutter plate 19 to slide in a transverse direction. In front of the die 9, there is further provided a cutter device 22 with a cutter 21 cutting the resin material 4.

The charger device 11 comprises a charge hopper 23 installed on the supply cylinder 7, a housing 24 holding the cartridge 10 so as to be extractable and retractable on the hopper 23, and a charge piston 25 charging the resin material 4 in the cartridge 10 on the hopper 23 into the supply cylinder 7. And the piston 25 is provided movable in an up-and-down direction by the a charging cylinder 26. Between the supply cylinder 7 and the charge hopper 23, there is provided a shutter device 27 so as to close their communicating passage. This shutter device 27 is constituted in substantially the same manner as the shutter device 16.

When the resin material 4 is to be supplied to the lower metal molding 2, the resin material 4 in the cartridge 10 is extruded by the piston 25 so that the resin material 4 is charged into the supply cylinder 7. In this instance, the shutter device 27 is opened, and to the contrary, the shutter device 16 is closed. Subsequently, the shutter device 27 is closed and the shutter device 16 is opened and, in turn, the resin material 4 in the supply cylinder 7 is extruded through the die 9 onto the lower metal molding 2 by the piston 8.

In such a conventional supply apparatus, there was the following practical problem since the shutter device 16 is provided in an intermediate portion of the resin passage 15. That is, after the resin material 4 is extruded onto the lower metal mold 2, the resin material 4 is cut by the cutter device 22. On the other hand, the shutter device 16 closes the shutter plate 19 in order to partition the resin material 4 remaining in the resin passage 15. For this process, if the resin material 4 is extruded onto the lower metal molding 2 in the next cycle newly extruded resin material 4 comes out in a shape separated into sheets because the cutting edge remained in the resin material 4 induces the division of the resin material during its extrusion.

Accordingly, if such a resin material 4 is fabricated in the resin press molding machine 1, the occurrence of a weld mark is increased. Therefore, strength of the molding product becomes weak at the places where weld marks are produced and the number of defective products will be increased.

On the other hand, if the shutter device 16 is completely removed, the resin material 4 in the resin passage 15 is no longer be cut. Therefore, it is possible to suppress the occurrence of weld marks and to obtain good quality products.

However, there will be caused a new problem in the case that the shutter device 16 is removed from the resin passage 15. That is, since the shutter device 16 is constructed such that it receives resin pressure when the resin material 4 is fed by the charge cylinder 26, the resin pressure comes to act directly on the flat-plate shaped cutter 21 of the cutter device 22 because of no shutting means in the resin passage 15. Especially, when the resin material 4 is charged into the supply cylinder 7, it is found that, by applying resistance on the extrusion cylinder 13 to cause back pressure against the piston 8, air or gases remaining inside of resin passage 15 can be scavenged nicely to enable manufacture of good products. For this reason, back pressure is set as high as possible, and resin pressure in the supply cylinder 7 becomes higher in accordance with this back pressure increase. Thus, the cutter 21 is pushed forward by this higher resin pressure.

On the other hand, since the cutter 21 needs to slide in front of the die 9 in an up-and-down direction, there are normally provided guides 30 (refer to FIG.4) at both ends. In this case, there are inherently formed gaps between these guides 30 and the cutter 21.

Accordingly, when the resin pressure is applied, there is caused a gap between the cutter 21 and a supporting plate 29 provided in front of die 9, and the resin material 4 is unexpectedly leaked through such a gap. Furthermore, if glass fibers included in the resin material 4 enter and are stuck in the gap, cutting operation of the resin material becomes worse. It is thus necessary to stop the machine to remove the glass fibers and clean up the cutter 21.

As a solution for such a problem, it may be considered to shorten the gap or to increase plate thickness in order to prevent the cutter 21 from being bent, however, its effect will be limited one.

Moreover, it is also found that a wide sheet width of the molded resin material 4 coming out from the opening 9A of the die 9 is preferable for molding operation therefore the current width of the molded resin material 4 is increased from 200 mm to 400 mm, and further considered to be widened to 600 to 800 mm.

Therefore, in accordance with such a width increase of the molded resin material 4, the cutter 21 increases its flat plate shape without increasing its width. By this shape modification of the cutter 21, it will be likely to cause bending to increase the gap, thus, it is predicted that the leakage of the resin material 4 will be greatly increased as a result.

SUMMARY OF THE INVENTION

The present invention has a purpose, in view of above conventional problems, to prevent leakage of resin material and disorder of cutting operation without increasing plate thickness of the cutter, thereby providing a resin material supply apparatus capable of permitting increase of resin material sheet size or higher back pressure.

To this end, according to a first aspect of the present invention, there is provided a resin material supply method for a resin press molding machine comprising steps of: extruding resin material in a supply cylinder toward a die by a piston; cutting the molded resin material by a cutter which slides along a front end surface of the die; supplying the cut resin material onto a metal mold; and charging new resin material into the supply cylinder by pressing the cutter toward the die at a position that the cutter closes an opening of the die.

Further, according to a second aspect of the present invention, there is provided a resin material supply apparatus for a resin press molding machine comprising a supply cylinder for extruding resin material toward a metal mold by a piston; a die having an opening for forming the resin material extruded from the supply cylinder; a cutter device having a cutter cutting the molded resin material by sliding along a front end surface of the die; a charger for charging resin material into the supply cylinder; and a pressing device pressing the cutter toward the die at a position that the cutter closes the opening of the die.

With this arrangement and method, after the resin material is supplied onto the metal mold, the cutter of the cutter device is slid along the front end surface of the die 9 so that the resin material 4 is cut by this cutter 21. Then, after this cutting operation, the resin material 4 is charged into the supply cylinder 7 by the charge device 11. In this case, the pressing device 36 presses the cutter toward the die to firmly close the opening of the die.

By pressing the cutter by means of the cutter device, it becomes capable of preventing occurrence of gaps or leakage of resin material even when the resin material is charged by higher back pressure as well as preventing disorder in cutting operation generated based on the leakage of the resin material. Further, it becomes possible to increase the apparatus size without increasing the plate thickness, since bending of the cutter is surely prevented.

The above and other objects, features and advantages of the present invention will become more apparent from the following detailed description which is to be read in conjunction with the accompanying drawings. However, the accompany drawings are merely illustrative and not restrictive to limit the scope of the invention.

BRIEF DESCRIPTION OF THE DRAWINGS

FIG. 5 is a schematic circuit diagram for a hydraulic pressure supply apparatus for the cutter device;

DETAIL DESCRIPTION OF THE PREFERRED EMBODIMENT

Figure 7:
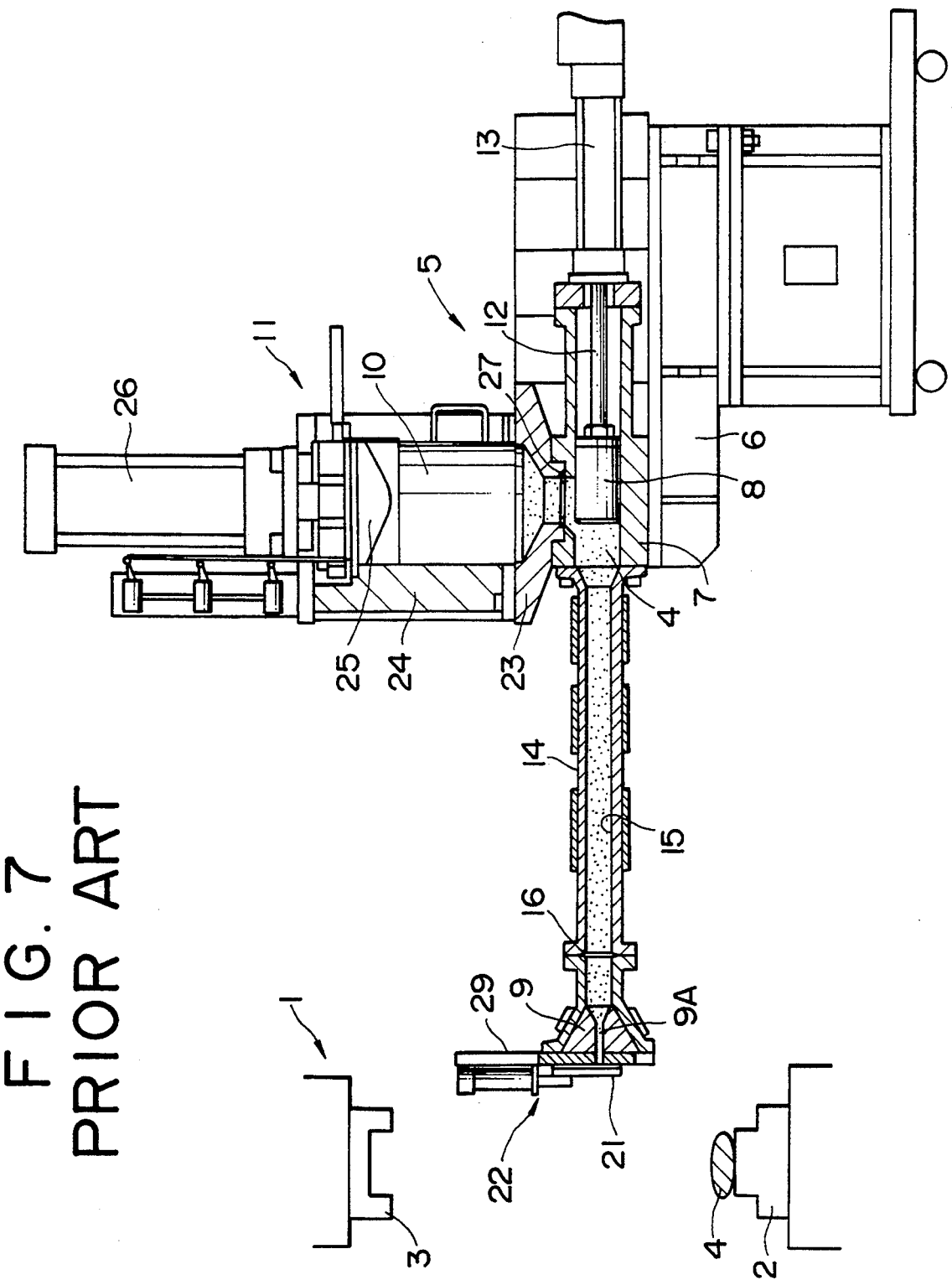
FIG. 7 is a partly fragmental front view showing one conventional example.

Hereinafter, referring now to the accompanying drawings, a preferred embodiment of the present invention is explained in detail. The same components as those of the conventional apparatus shown in FIG. 7 are suffixed by the same reference numerals, and their explanations are omitted here.

Figure 1:
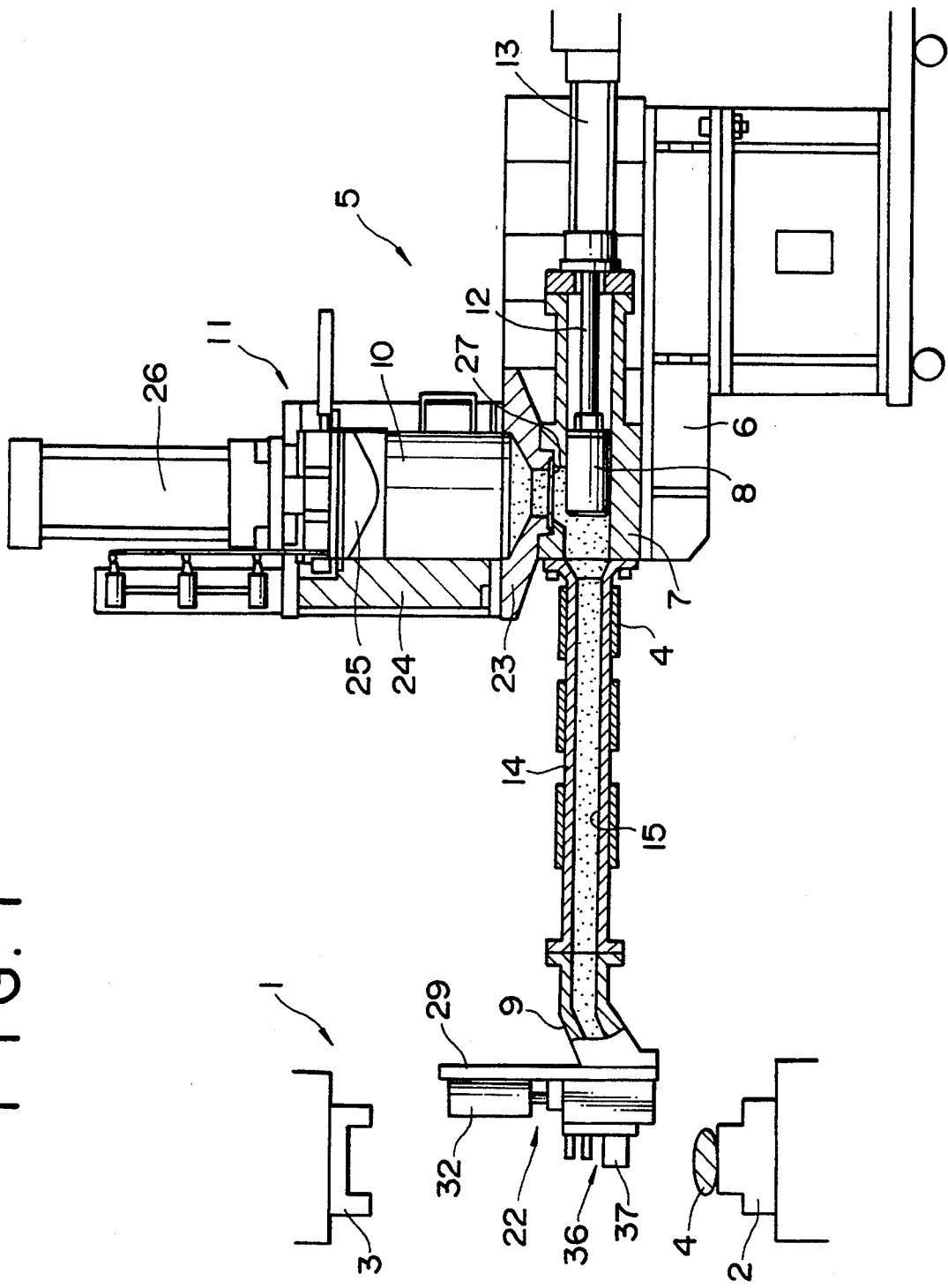
FIG. 1 is a partly fragmental front view showing one embodiment of the present invention.
Figure 2:
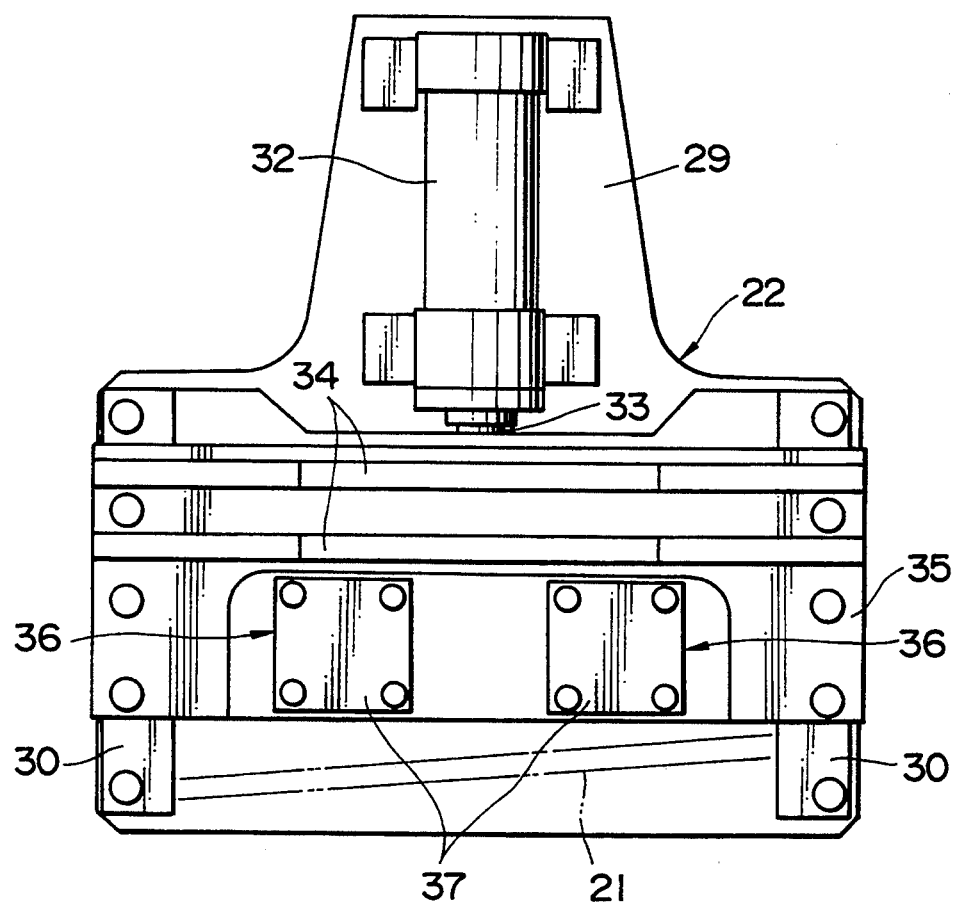
FIG. 2 is a front view showing a cutter device of above one embodiment of the present invention.
Figure 3:
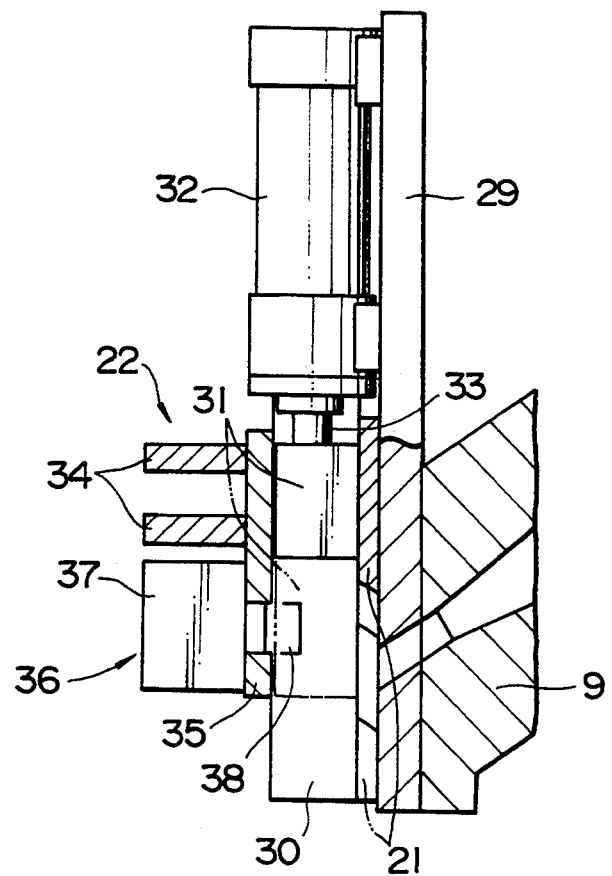
FIG. 3 is a partly fragmental side view showing the cutter device of FIG. 2.
Figure 4:
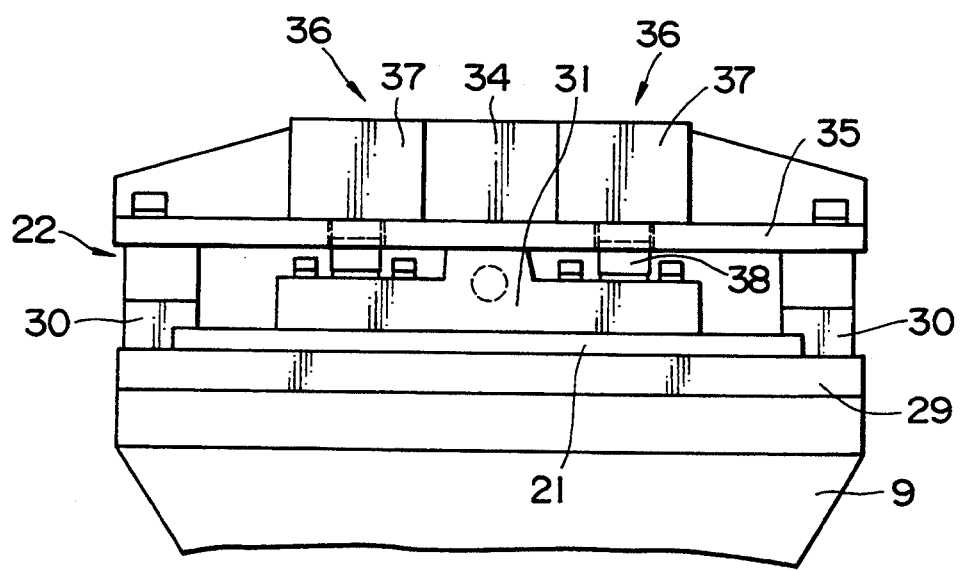
FIG. 4 is a bottom view showing the cutter device of FIG. 2.

In FIG. 1, since there is no means corresponding to the shutter device 16 of the conventional apparats between the cylindrical body 14 of the supply cylinder 7 and the die 9, the cutter 21 of the cutter device 22 is constituted to be able to close the resin passage 15 at the front end of the die 9 after cutting operation. Namely, the supporting plate 29 is installed in front of the die 9 as shown in FIGS. 2 to 4, the cutter 21 is disposed in front of the supporting plate 29 so as to be slidable in an up-and-down direction while being supported and guided by a pair of right and left guides 30, 30.

There are formed clearances between the cutter 21 and the guides 30 which are required to move the cutter 21 in the up-and-down direction. The cutter 21 is connected through a cutter installing block 31 to a piston rod 33 of the cutter cylinder 32 so that the cutter 21 can slide in the up-and-down direction by expansion and contraction of the cutter cylinder 32. The cylinder 32 is fixed on an upper portion of the supporting plate 29. Between a pair of right and left guides 30, a bracket 35 with a reinforcement rib 34 is bridged in a transverse direction. A pair of pressing devices 36 for pressing the cutter 21 towards the supporting plate 29 at the lower position are provided at right and left ends of the bracket 35. Each pressing device 36 is constructed by a pressing cylinder 37, and its piston rod 38 is provided to be able to abut to the cutter installing block 31.

The cutter cylinder 32 and the pressing cylinder 37 are connected to a switching valve 39 as shown in FIG. 5, and there is provided a sequence valve 40 between the bottom side of the pressing cylinder 37 and the switching valve 39.

With above constitution, when the resin material 4 in the supply cylinder 7 is supplied on the lower metal mold, the cutter 21 is positioned at its upper position, and supplies the resin material 4 so as to form in a sheet shape by the die 9. And then, the cutter cylinder 32 is extended to lower the cutter 21 to cut the resin material 4. During this lowering movement of the cutter 21, the sequence valve 40 does not work because hydraulic pressure in the circuit is low. Therefore, pressurized oil does not flow in the pressing cylinder 37.

However, when the cutter 21 is further lowered to reach a position that the cutter 21 closes the opening of the die 9 as shown by a phantom line in FIG. 3, the cutter cylinder 32 reaches the maximum stroke, thus the hydraulic pressure in the circuit is increased to actuate the sequence valve 40 and pressurized oil is supplied in the pressing cylinder 37. For this operation, the pressing cylinder 37 is extended, its piston rod 38 presses the cutter 21 through the cutter installing block 31 toward the supporting plate 29. Accordingly, when the resin material 4 is charged from the charge device 11 to the supply cylinder 7, it becomes possible to suppress the occurrence of gaps between the cutter 21 and the supporting plate 29 even when high back pressure is given under the resistance of the pressing cylinder 13, thereby surely preventing leakage of the resin material.

Moreover, even in the case that the cutter 21 is a large flat plate shape, it is possible to prevent the cutter 2 from bending without increasing plate thickness.

When the cutter 21 is raised, the switching valve 39 is switched over to a lift side and, in turn, the cutter cylinder 32 is contracted to raise the cutter 21. At this moment, the pressing cylinder 37 is contracted at the same time by the switchover movement of the switching valve 39 to remove the pressing on of the cutter 21. Accordingly, the resin material does not leak even when the cutter 21 is lowered to cut the resin material 4, thus the cutting operation is surely prevented.

Moreover, though the pressing device 36 is explained as the pressing cylinder type in this embodiment, it is possible to use a motor-driven screw mechanism. Further, it is preferable to press the cutter 21 or the cutter installing block 31 through a cam mechanism.

Figure 6:
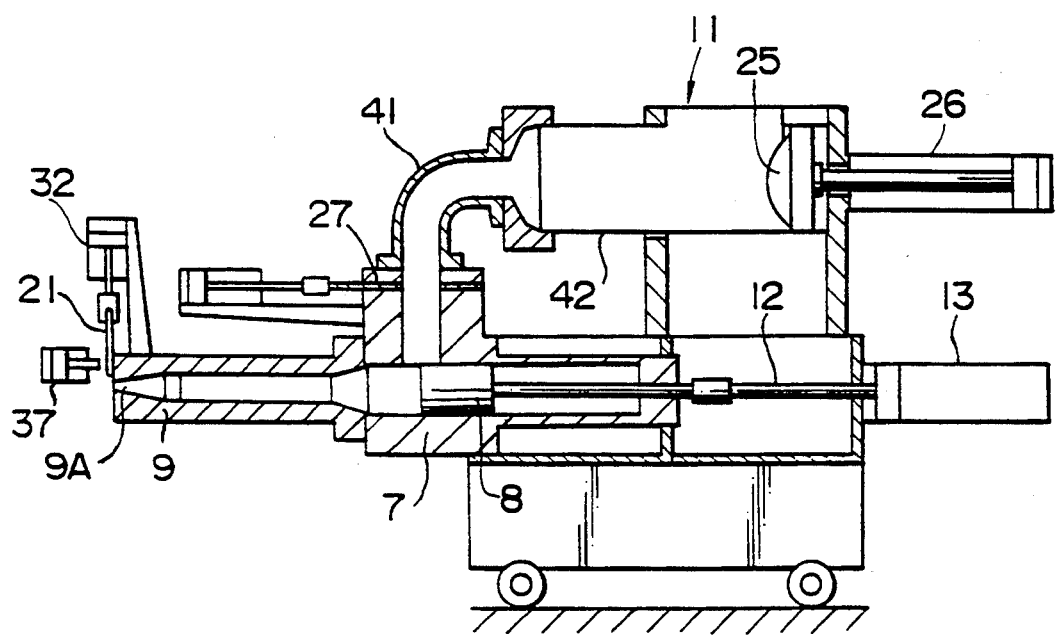
FIG. 6 is a view showing constitution of another embodiment of the present invention.
Figure 8:
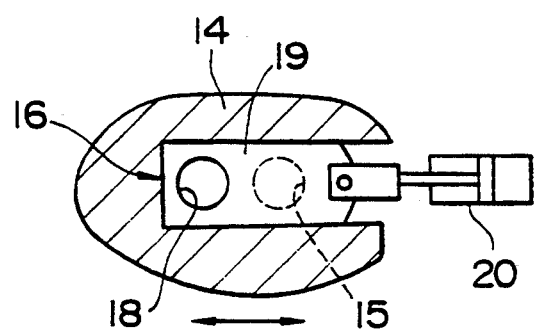
FIG. 8 is a cross-sectional view showing a shutter device.

The charging device 11 can instead be constructed, as shown in FIG. 6, in such a manner that a cylinder 42 connected through an elbow 41 to the supply cylinder 7 is provided in parallel with the supply cylinder 7 so that the resin material 4 in the cylinder 42 can be charged by the piston 25. And, the operation can be carried out in the same manner as the previous embodiment.

As is explained in the forgoing description, in accordance with the present invention, the pressing device 36 is provided for pressing the cutter 21 of the cutter device 22 toward the die 9, therefore it becomes possible to prevent the leakage of resin material and disorder of cutting operation without increasing plate thickness of the cutter 21, thereby enabling to suit for increased size and higher back pressure.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and-bounds are therefore intended to embraced by the claims.

What is claimed is:

1. A resin material supply apparatus for a resin press molding machine comprising:
   a supply cylinder including a piston for extruding resin material toward a metal mold;
   a die having an opening for forming the resin material extruded from the supply cylinder;
   a cutter device having a cutter cutting the molded resin material by sliding along a front end surface of the die;
   a charger for charging resin material into the supply cylinder; and
   a pressing device external of the supply cylinder for pressing the cutter toward the die when the cutter is at a position that the cutter closes the opening of the die.

2. A resin material supply apparatus for a resin press molding machine in accordance with claim 1 in which said cutter moves in an up-and-down direction.

3. A resin material supply apparatus for a resin press molding machine in accordance with claim 2 in which further comprising a cutter cylinder for sliding the cutter in the up-and-down direction.

4. A resin material supply apparatus for a resin press molding machine in accordance with claim 1 in which said charge device supplying resin material is connected through an elbow to the supply cylinder, and includes a charge cylinder disposed in parallel with the supply cylinder and a piston accommodated in the charge cylinder.

5. A resin material supply apparatus for a resin press molding machine in accordance with claim 1 in which said pressing device is constituted by a motor-driven screw mechanism.

6. A resin material supply apparatus for a resin press molding machine in accordance with claim 1 in which said pressing device is constituted by a cam mechanism.

7. A resin material supply apparatus for a resin press molding machine in accordance with claim 1 in which said pressing device is constituted by a pressing cylinder.

8. A resin material supply apparatus for a resin press molding machine in accordance with claim 7 in which further comprising a cutter cylinder for sliding the cutter in an up-and-down direction.

9. A resin material supply apparatus for a resin press molding machine in accordance with claim 8 in which said cutter cylinder and the pressing cylinder are connected to a switching valve, and a sequence valve is interposed between a bottom side of the pressing cylinder and the switching valve.

* * * * *